(No Model.) 2 Sheets—Sheet 2.
C. F. LARZELERE.
FISHING REEL.
No. 558,821. Patented Apr. 21, 1896.
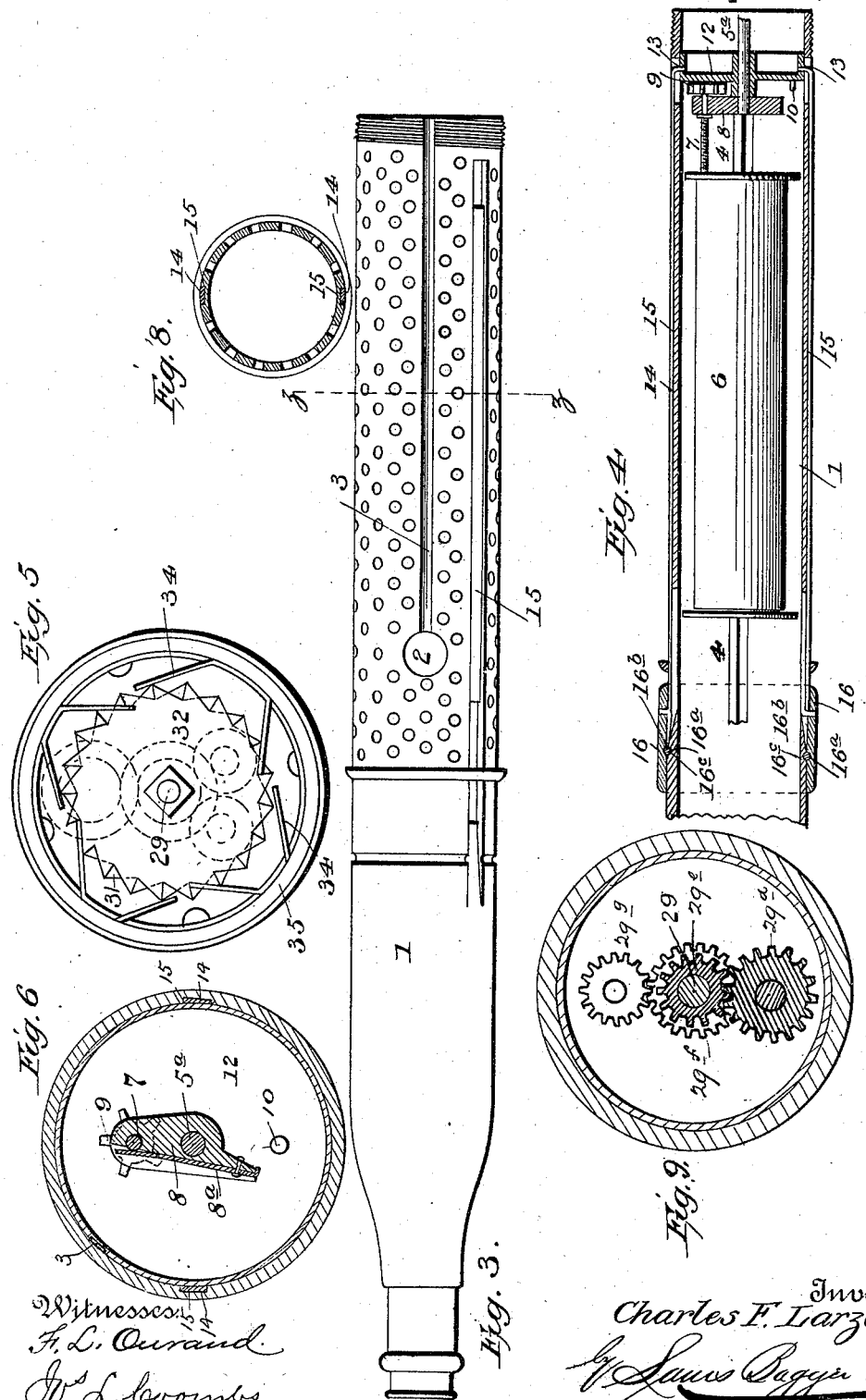

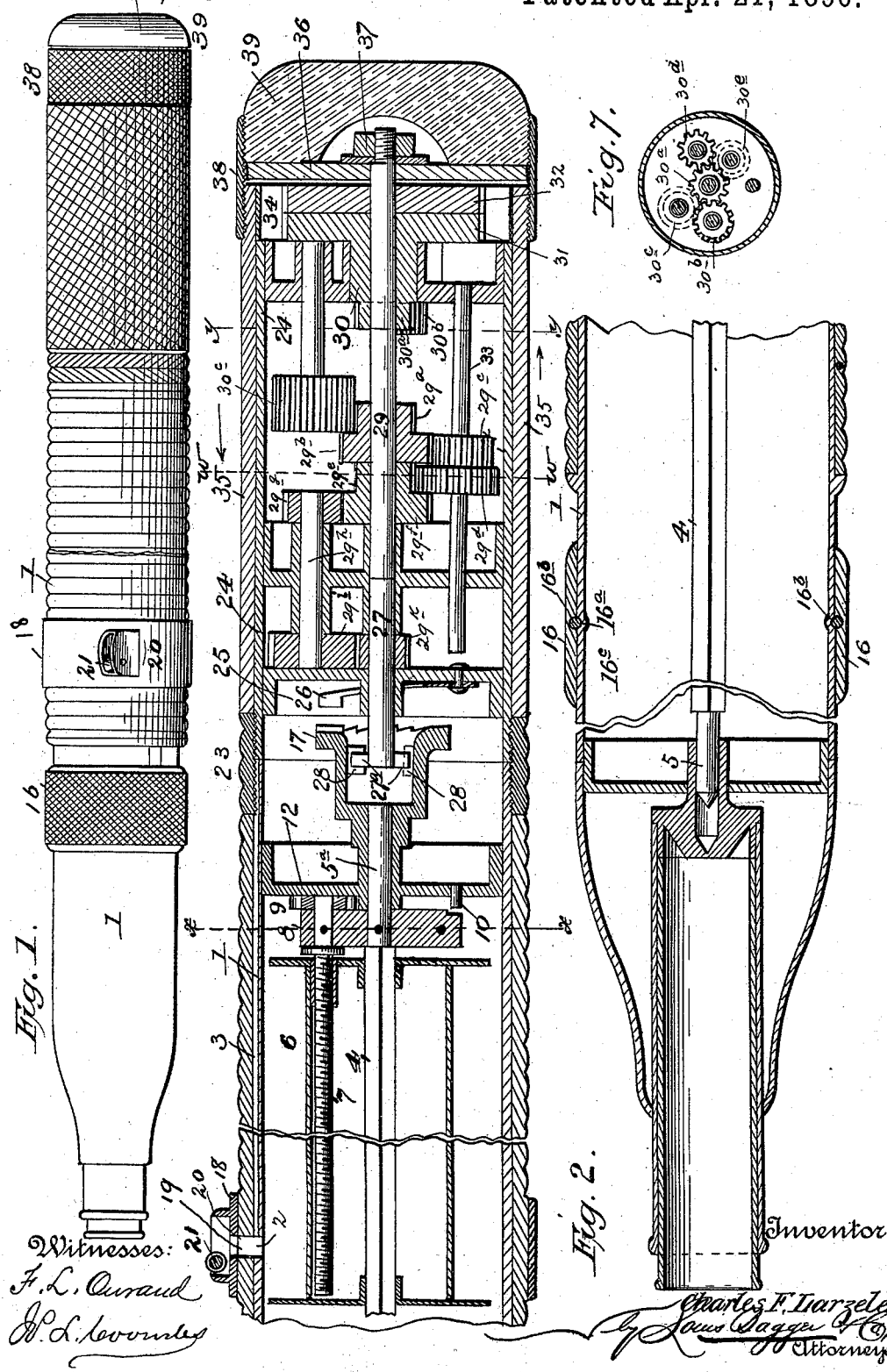

UNITED STATES PATENT OFFICE.

CHARLES F. LARZELERE, OF DAVENPORT, NEW YORK, ASSIGNOR OF ONE-HALF TO WILLIAM H. ROBERTS, OF SAME PLACE.

FISHING-REEL.

SPECIFICATION forming part of Letters Patent No. 558,821, dated April 21, 1896.

Application filed April 13, 1895. Serial No. 545,651. (No model.)

*To all whom it may concern:*

Be it known that I, CHARLES F. LARZELERE, a citizen of the United States, and a resident of Davenport Centre, in the county of Delaware and State of New York, have invented certain new and useful Improvements in Fishing-Reels; and I do hereby declare that the following is a full, clear, and exact description of the invention, which will enable others skilled in the art to which it appertains to make and use the same, reference being had to the accompanying drawings, which form a part of this specification.

My invention relates to fishing-reels which are concealed within the butt of the rod and which are operated to wind or reel up the line by oscillating the end of the butt; and its object is to provide an improved device of this character which shall possess important advantages with respect to efficiency in operation.

The invention consists in the novel construction and combination of parts hereinafter fully described and claimed.

In the accompanying drawings, Figure 1 is an elevation of the butt of a fishing-rod constructed in accordance with my invention. Fig. 2 is a central longitudinal section of the same. Fig. 3 is a detail elevation showing the butt with the hand-grasp and rotating end removed. Fig. 4 is a horizontal sectional view of the butt. Fig. 5 is an end view of the rotatable cylinder, the cap being removed. Fig. 6 is a transverse section on the line $x\,x$, Fig. 2. Fig. 7 is a similar view on the line $y\,y$, Fig. 2. Fig. 8 is a similar view on the line $z\,z$, Fig. 3. Fig. 9 is a transverse section on the line $w\,w$, Fig. 2.

In the said drawings the reference-numeral 1 designates the butt of a fishing-rod, consisting of a cylinder, preferably of metal, tapering at its forward end and adapted to receive the joint of the rod. The rear end of said cylinder is preferably perforated to reduce weight, and is provided with an aperture 2 for the passage of the line and with a groove 3 extending from said aperture to the rear end for facilitating the threading of a line upon the reel.

The numeral 4 designates a spindle, angular in cross-section, except at its forward end, where it is made cylindrical, forming a journal 5, which rotates in a bearing in the forward end of the cylinder. The spindle near its lower end is also formed with a cylindrical journal $5^a$, which rotates in a collar 12, hereinafter described. This shaft is movable in the said cylinder, so as to throw the ratchet at the rear end thereof into and out of engagement with the mechanism by which the spindle is rotated, as will be hereinafter explained. Mounted on this spindle is a slidable reel 6, having heads or circular flanges at each end. These heads have angular apertures through which the spindle passes, so that while it rotates with said spindle it is capable of sliding thereon. Passing through a screw-threaded aperture in the rear head of the reel is a rotatable screw-rod 7, one end of which is journaled in an arm 8, secured to said spindle, and at its extremity is a spur-wheel 9, the teeth of which are adapted to engage with the stud 10 on a collar 12 when said spindle is rotated. The object of this construction is to feed the reel up and down in the cylinder as it is rotated, so that the line as it leaves the reel is always opposite the aperture in the cylinder, and the said arm 8 is provided with a spring $8^a$, which engages with the spur-wheel, so as to allow only one revolution thereof to be made each time it is struck by the stud.

The spindle passes loosely through an aperture in collar 12, and the latter is formed with two peripheral slots 13, with which engage the bent ends of two spring-metal arms 14, which are seated and slidable in peripheral grooves 15 in the cylinder 1. The forward ends of these springs are secured to a slidable collar 16 on said cylinder. This collar in its interior is formed with a groove $16^a$, in which is seated a spring $16^b$, consisting of a circularly-bent piece of metal, the ends of which do not meet, which is adapted to engage with a peripheral groove $16^c$ on the tube or cylinder 1 when the sleeve is pulled forward and through the connections hold the reel in place. This spring is of less diameter than the cylinder, so that when the collar is pushed back it will be expanded so as to seat itself in the groove in the latter. When the collar or sleeve is pulled forward, when it reaches the groove in the cylinder, the spring will by its resiliency seat itself therein. The rear end of the spindle is provided with a ratchet-wheel 17. The numeral 18 designates a sleeve fitting on the said cylinder and is provided with an aperture 19, coinciding with the aperture in the sleeve through which the line passes. The line also passes through an aperture-lug in a collar 20, secured to said sleeve, which lug is provided with a small pulley 21.

At the rear end of the cylinder 1 is a screw-threaded collar 23, with which is connected a cylinder 24, closed at its outer end and having a head 25 near its front or inner end. This head is provided with a spring-dog 26, which is adapted to engage with the ratchets of wheel 17. Passing through said head is a short shaft 27, having two radial arms 27$^a$ at its front end, which are adapted to engage with studs 28 in a central recess in the said ratchet-wheel 17. Located in this cylinder is a multiplying-gear, which may be of any suitable construction, and connected with this gear is a shaft 29 and a sleeve 30, also connected with said multiplying-gear, which shaft and sleeve revolve in the same direction.

Secured to the shaft 29 is a ratchet-wheel 32, and rotatable on said shaft and formed with said sleeve 30 is an opposite ratchet-wheel 31. Oppositely-arranged spring-pawls secured to the interior of a sleeve 35, rotatable on the said cylinder, are adapted to alternately engage with said wheels, so that as the sleeve is oscillated the said wheels will be alternately rotated in opposite directions. Secured to the shaft 29 is a double pinion 29$^a$ 29$^b$. The pinion 29$^b$ meshes with a smaller pinion 29$^c$ of a double pinion loose on a shaft 33. The larger portion 29$^d$ of this double pinion meshes with the part 29$^e$ of a double pinion fast to shaft 29, while the large portion 29$^f$ of this last-named pinion meshes with a pinion 29$^g$ on a shaft 29$^h$, provided with a pinion 29$^i$, engaging with a pinion 29$^k$ on the shaft 27. Mounted upon the sleeve 30 is a pinion 30$^a$, which meshes with a pinion 30$^b$, in turn meshing with a pinion 30$^c$, which meshes with the small part 29$^a$ of the double pinion on shaft 29. This pinion 29$^a$ also meshes with pinion 30$^d$, engaging with a pinion 30$^e$, meshing with pinion 30$^a$. By this construction the shaft 27 is continuously, or nearly so, rotated in one direction as the ratchet-wheels 31 and 32 are alternately oscillated in opposite directions.

The operation is as follows: The different parts comprising the device are shown connected in Figs. 1 and 2. The line (not shown) is wound upon the reel and passes through the apertures in cylinder 1 and the sleeve thereon and through the apertured lugs on the collar secured to said sleeve, and from which it passes to the joints of the rod, as usual. To allow the line to run free from the reel, the collar 16 is slid forwardly, which, through the medium of the spring-arms 14 and the collar 12, will cause the spindle to be correspondingly moved and the ratchet-wheel on the end thereof to be thrown out of engagement with the dog 26 and the ratchet-arms 27$^a$. By now pulling on the line the reel and spindle will revolve freely. If the collar 16 be pushed in the opposite direction, the dog 26 will engage with the ratchets of wheel 17, and the tension of the dog will produce a variable click resistance and prevent the line from running out too fast. To reel up the line, the sleeve 35 is oscillated, when the pawls 34 will alternately engage with the ratchets 30 and rotate the same, and the pawls being oppositely arranged the wheels will be rotated in the same direction, and through the medium of the multiplying-gear the shaft carrying the radial arms 27$^a$ will be rapidly rotated, and these arms, engaging with the studs in the recess of the ratchet-wheel 17, will rotate the spindle and reel and cause the line to be rapidly wound upon the latter. By means of the screw-rod at one end of the reel the spur-wheel and the stud on the collar 12, as said reel is rotated to wind or unwind the reel, the screw-rod will be correspondingly rotated, whereby the point on the reel at which the line leaves the same will always be opposite the aperture in the cylinder 1—that is to say, as the reel is rotated by pulling out the line the stud on the collar 12 will strike the spur-wheel and rotate the screw-rod so that the reel will be fed forward. Where the reel is rotated in the opposite direction as the line is reeled on, by oscillating sleeve 35, the screw-rod will be rotated in the opposite direction by the opposite sides of the spurs of the spur-wheel engaging with the stud 10, and the reel will be forced rearwardly.

Having thus fully described my invention, what I claim is—

1. The combination with the cylinder, having an aperture therein, the sleeve mounted thereon having a corresponding aperture, the spindle located in said cylinder and provided with a reel, the collar on said spindle, the arms secured thereto, the sliding collar to which said arms are connected, and the ratchet-wheel on the end of said spindle provided with studs, of the short cylinder connected with said cylinder the spring-dog connected therewith, and means substantially as described for rotating said shaft.

2. The combination with the cylinder having an aperture therein the sleeve mounted thereon having a corresponding aperture, the spindle located in said cylinder and provided with a reel, the collar on said spindle, the arms secured thereto the slidable collar to which said arms are connected, and the ratchet-wheel on the end of said spindle provided with studs of the short cylinder connected with said cylinder, the spring-dog connected therewith, the shaft having radial arms, the multiplying-gear located in said short cylinder, the oppositely-arranged ratchet-wheels on the end of said short cylinder and the oscillatory sleeve provided with oppositely-arranged pawls engaging with said ratchets, substantially as described.

3. The combination with the cylinder having an aperture, the sleeve mounted thereon, the rotatable and slidable spindle, the slidable reel mounted thereon, the screw-rod connected therewith and journaled in an arm secured to said spindle, the spur-wheel, the collar through which said spindle passes having a stud engaging with the arm of said spur-wheel, the arms engaging with slots in said collar and seated in grooves in said cylinder, the slidable collar to which said arms are secured, and means for rotating said spindle to reel up the line, substantially as described.

4. The combination with the cylinder forming the butt of a fishing-rod having an aperture therein, of the rotatable spindle and the reel located in said spindle, the oscillatory sleeve and connections for rotating said reel and the screw-cap connected with the outer end of the sleeve; substantially as described.

5. The combination with the cylinder forming the butt of a fishing-rod, having an aperture therein and the sleeve mounted thereon having a corresponding aperture, of the rotatable and slidable spindle, the reel mounted thereon, the collar on said spindle, the arms connected therewith, the slidable sleeve, the ratchet-wheel and studs, the short cylinder, the dog, the shafts having radial arms the multiplying-gear and the oscillatory sleeve for operating said gear substantially as described.

6. The combination with the hollow butt of a fishing-rod and the rotatable reel on a shaft therein, of the oscillatory sleeve mounted on said butt, the multiplying-gear connected to said shaft and operated by said oscillatory sleeve whereby said reel is rotated by oscillating said shaft.

In testimony that I claim the foregoing as my own I have hereunto affixed my signature in presence of two witnesses.

CHARLES F. LARZELERE.

Witnesses:
ALFRED BOLGER,
JAMES W. RACE.